United States Patent

[11] 3,607,835

[72] Inventors Teo Paleologo;
Roberto Costa; Luigi Lugo, all of Milan, Italy
[21] Appl. No. 784,169
[22] Filed Dec. 16, 1968
[45] Patented Sept. 21, 1971
[73] Assignee Societa Italiana Resine S.p.A.
Milan, Italy
[32] Priority Dec. 20, 1967
[33] Italy
[31] 24187-A/67

[54] ACRYLONITRILE COPOLYMERS AND METHOD OF PREPARING THEM
13 Claims, No Drawings

[52] U.S. Cl. .................................................. 260/63 N,
260/32.6 N, 260/85.5 ES, 260/85.5 AM, 260/89.7 R
[51] Int. Cl. ...................................................... C08f 15/38,
C08f 15/40

[50] Field of Search ........................................... 260/63 N,
89.7, 85.5, 85.5 ES, 85.5 AM

[56] References Cited
UNITED STATES PATENTS

| | | | |
|---|---|---|---|
| 3,025,278 | 3/1962 | Pitts .............................. | 260/85.5 |
| 3,277,056 | 10/1966 | Coleman ...................... | 260/63 |
| 3,425,942 | 2/1969 | Coleman ...................... | 252/51.5 |
| 3,497,467 | 2/1970 | Coleman ...................... | 260/29.6 |

Primary Examiner—William H. Short
Assistant Examiner—Lester L. Lee
Attorney—Sughrue, Rothwell, Mion, Zinn & Macpeak ABSTRACT: Dyeable acrylonitrile copolymers for spinning contain as comonomers diacetonacrylamide and esters selected from methyl and ethyl esters of acrylic and methacrylic acids.

ACRYLONITRILE COPOLYMERS AND METHOD OF PREPARING THEM

The invention relates to acrylonitrile copolymers and method of preparing them.

The major use of acrylonitrile copolymers is in the manufacture of threads. One of the problems arising in the manufacture of acrylonitrile threads is their coloring, and an object of the invention is to provide acrylonitrile copolymers suitable for dyeing and having elasticity and other properties suited to the manufacture of threads, more particularly of low denier number, by spinning.

Suitable copolymers, according to the invention comprise acrylonitrile with a quantity of other comonomers ranging from 1 to 15 percent, preferably 3 to 10 percent, by weight, the comonomers comprising esters selected from methyl and ethyl esters of acrylic and methacrylic acids and, essentially, diacetonacrylamide.

This comonomer, which is present in the copolymer at 0.05 to 1.5 percent, preferably 0.1 to 1.0 percent, by weight, is capable of fixing acidic and basic dyestuffs.

The invention also provides a method of preparing acrylonitrile copolymers of this composition by polymerizing the monomers in an aqueous emulsion in the presence of peroxide catalysts soluble in the reaction medium, or of reduction-oxidation systems, for instance persulfates and bisulfites, or, preferably, nitrites and metabisulfites, generally in the form of alkali salts.

The polymerization temperatures are between 45° and 60° C., preferably 50° to 55° C., the reaction periods depending upon the desired molecular weight, but being in any case 5 to 15 hours.

Under these conditions acrylonitrile copolymers are obtained of controlled molecular weight, ranging from 70,000 to 150,000 measured according to Staudinger.

Acrylonitrile copolymers of molecular weight values within this range and having moreover a restricted molecular weight distribution, are useful in the manufacture of threads. The polymerization method of the invention is further advantageous in that the yield is very high, exceeding 95 percent on the basis of the changed monomers. Moreover, the polymerization reaction is easily controllable and it may be carried out continuously, for example in a plurality of reactors in series.

The invention is illustrated by the following example.

EXAMPLE

A jacketed reactor of AISI 304 stainless steel provided with an anchor stirrer, of a useful volume of about 300 liters is charged at room temperature with 11 kg. acrylonitrile, 1 kg. methylmethacrylate and 0.06 kg. diacetoneacrylamide.

The charge is brought to the desired volume with deionized water and stirring is started by rotating the anchor stirrer at a rate of about 100 r.p.m.

Still maintaining room temperature, nitrite and metabisulphite in the form of sodium salts in a quantity of 0.4 and 3.0 percent by weight "respectively" on the monomer mix are added.

Aqueous sulfuric acid is thereafter added till the pH is 2.7.

The temperature is gradually raised up to 50° C. over about 1 hour.

The conditions are then adjusted to maintain such temperature during the progress of the reaction, the reaction heat being removed through the reactor jacket.

After the fifth reaction hour, from the time of reaching 50° C., samples are withdrawn and the molecular weight of the copolymer is determined by dissolving 0.2 g. in 100 me. dimethylformamide and determining the fall time in an Ostwald viscosimeter.

The reaction is considered completed after about 10 hours, when the molecular weight of the copolymer has reached 90,000.

The contents of the reactor are then discharged, and filtered and the copolymer is washed and finally dried.

The copolymer proves useful in the manufacture of threads of 0.3 to 0.6 deniers by the wet spinning method described in a prior patent application, Italian application No. 23,652 filed Dec. 7, 1967.

What we claim is:

1. An acrylonitrile copolymer adapted to fix acid and basic dyestuffs and which can be converted into threads, said copolymer having a molecular weight of 70,000 to 150,000, measured according to the Staudinger method, and consisting essentially of:
    1. acrylonitrile,
    2. 1 to 15 percent by weight based on the weight of the copolymer of a comonomer selected from the group consisting of a methyl ester of acrylic acid, an ethyl ester of acrylic acid, a methyl ester of methacrylic acid and an ethyl ester of methacrylic acid, and
    3. 0.05 to 1.5 percent by weight of diacetonacrylamide,
        said copolymer being obtained by polymerizing, in an aqueous emulsion, the above-identified copolymeric constituents in monomeric form in the presence of a catalytic system consisting essentially of an alkali metal nitrate and an alkali metal metabisulfite, said polymerization being conducted at a temperature of from 45° to 60° C. for a period of from 5 to 15 hours.

2. The copolymer of claim 1 comprising from 3 to 10 percent by weight of said ester comonomer.

3. The copolymer of claim 1 wherein said ester comonomer is an acrylic ester.

4. The copolymer of claim 1 wherein said ester comonomer is a methacrylic ester.

5. The copolymer of claim 1 wherein said alkali metal is sodium.

6. A method of preparing an acrylonitrile copolymer consisting essentially of acrylonitrile, from 1 to 15 percent by weight based on the weight of the copolymer of a comonomer selected from the group consisting of a methyl ester of acrylic acid, an ethyl ester of acrylic acid, a methyl ester of methacrylic acid and an ethyl ester of methacrylic acid, and 0.05 to 1.5 percent by weight based on the weight of the copolymer of diacetonacrylamide, comprising polymerizing the above-recited components in the form of an aqueous emulsion in the presence of a catalytic system consisting essentially of an alkali metal nitrate and an alkali metal metabisulfate at a temperature of from 45° to 60° C. for from 5 to 15 hours.

7. The method of claim 6 wherein said polymerization is conducted at 50° to 55° C.

8. The method of claim 6 wherein said alkali metal is sodium.

9. The method of claim 6 wherein said copolymer comprises from 3 to 10 percent by weight of said ester comonomer and 0.1 to 1.0 percent of said diacetonacrylamide.

10. The method of claim 6 wherein said ester comonomer is an acrylic ester.

11. The method of claim 6 wherein said ester comonomer is a methacrylic ester.

12. The copolymer of claim 1 where from 0.1 to 1.0 percent of diacetonacrylamide is present.

13. The method of claim 6 where said polymerization provides a copolymer having a molecular weight of 70,000 to 150,000, measured according to the Staudinger method.